(12) United States Patent
Handley

(10) Patent No.: US 8,849,031 B2
(45) Date of Patent: Sep. 30, 2014

(54) DOCUMENT ANALYSIS SYSTEMS AND METHODS

(75) Inventor: John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 2180 days.

(21) Appl. No.: 11/254,924

(22) Filed: Oct. 20, 2005

(65) Prior Publication Data

US 2007/0092140 A1    Apr. 26, 2007

(51) Int. Cl.
*G06K 9/00*    (2006.01)

(52) U.S. Cl.
CPC ................................. *G06K 9/00456* (2013.01)
USPC ............ 382/173; 382/164; 382/166; 382/176; 382/180; 382/232; 382/243; 382/283; 382/292

(58) Field of Classification Search
USPC ......... 382/173, 176, 180, 232, 302, 164, 243, 382/166, 203, 170, 283, 292
See application file for complete search history.

(56) References Cited

U.S. PATENT DOCUMENTS

| | | | |
|---|---|---|---|
| 5,539,841 A * | 7/1996 | Huttenlocher et al. | 382/218 |
| 5,907,632 A * | 5/1999 | Suzuki | 382/187 |
| 6,006,240 A | 12/1999 | Handley | |
| 6,411,731 B1 * | 6/2002 | Saito | 382/173 |
| 6,621,941 B1 * | 9/2003 | Syeda-Mahmood et al. | 382/306 |
| 6,649,542 B2 | 11/2003 | Miura et al. | |
| 6,954,532 B1 | 10/2005 | Handley et al. | |
| 7,324,120 B2 * | 1/2008 | Curry et al. | 345/611 |
| 7,379,587 B2 * | 5/2008 | Curry et al. | 382/164 |
| 7,403,661 B2 * | 7/2008 | Curry et al. | 382/232 |
| 2001/0012401 A1 * | 8/2001 | Nagy | 382/187 |
| 2004/0042687 A1 * | 3/2004 | Curry et al. | 382/302 |
| 2004/0071362 A1 | 4/2004 | Curry et al. | |
| 2004/0096102 A1 * | 5/2004 | Handley | 382/164 |
| 2004/0227758 A1 * | 11/2004 | Curry et al. | 345/426 |
| 2004/0263908 A1 | 12/2004 | Jacobs et al. | |
| 2005/0175249 A1 * | 8/2005 | Ferlitsch | 382/243 |
| 2005/0180628 A1 * | 8/2005 | Curry et al. | 382/164 |
| 2005/0180642 A1 * | 8/2005 | Curry et al. | 382/232 |
| 2005/0180648 A1 | 8/2005 | Curry et al. | |
| 2005/0286776 A1 * | 12/2005 | Bai et al. | 382/232 |
| 2006/0056710 A1 * | 3/2006 | Bai et al. | 382/232 |

(Continued)

OTHER PUBLICATIONS

J. Handley, "Document Recognition", Electronic Imaging Technology, Chapter 8, pp. 289-316, 1999.

*Primary Examiner* — Matthew Bella
*Assistant Examiner* — Julian Brooks
(74) *Attorney, Agent, or Firm* — Gibb & Riley, LLC

(57) ABSTRACT

A method embodiment herein begins by capturing a source image. The source image is segmented into first planes. The first planes can each comprise a mask plane and foreground plane combination. The binary images in the first planes are structurally analyzed to identify different regions of text, tables, handwriting, line art, equations, etc., using a document model that has information of size, shape, and spatial arrangement of possible regions. Then, the method extracts (crops out) these regions from the foreground plane to create second mask/foreground plane pairs. Thus, the method creates "second" planes from the first planes, so that a separate second plane is created for each of the regions. Next, tags are associated with each of the second planes (to create tagged mask/foreground plane pairs) and the second planes and associated tags are combined into a mixed raster content (MRC) document. Then, the MRC can be stored and/or transmitted so that the method can perform a separate recognition process (OCR, table recognition, handwriting recognition, etc.) on each of the second planes to produce tagged output.

11 Claims, 4 Drawing Sheets

(56) References Cited

U.S. PATENT DOCUMENTS

| | | | |
|---|---|---|---|
| 2007/0092140 A1* | 4/2007 | Handley | 382/176 |
| 2008/0273807 A1* | 11/2008 | Dauw et al. | 382/237 |
| 2008/0292130 A1* | 11/2008 | Nafarieh et al. | 382/100 |
| 2010/0142806 A1* | 6/2010 | Malik et al. | 382/164 |
| 2010/0142820 A1* | 6/2010 | Malik et al. | 382/176 |
| 2011/0026814 A1* | 2/2011 | Nuuja et al. | 382/164 |
| 2011/0069885 A1* | 3/2011 | Malik et al. | 382/176 |
| 2012/0039534 A1* | 2/2012 | Malik et al. | 382/173 |

* cited by examiner

DOCUMENT ANALYSIS SYSTEMS AND METHODS

BACKGROUND

As explained in U.S. Patent Publication 2005/0180648, the complete disclosure of which is incorporated herein by reference, a new approach to satisfying the compression needs of data, such as the different types of image data, is to use an encoder pipeline that uses a mixed raster content (MRC) format to describe the data. The image data, such as for example, image data defining a composite image having text intermingled with color and/or gray-scale information, is segmented into two or more planes. These planes are generally referred to as the background plane and the foreground planes. A selector plane is generated to indicate, for each pixel in the composite image, which of the image planes contains the actual image data that should be used to reconstruct the final output image. Segmenting the image data into planes in this manner tends to improve the overall compression of the image, because the data can be arranged into different planes such that each of the planes is smoother and more readily compressible than the original image data. Segmentation also allows different compression methods to be applied to the different planes. Thus, the most appropriate compression technique for the type of data in each plane can be applied to compress the data of that plane.

SUMMARY

A method embodiment herein begins by capturing a source image (e.g., scanning a color document). The source image is segmented into first planes (e.g., background plane, a foreground plane (comprising primarily text color), a mask plane containing text image data, and a plurality of mask/foreground plane pairs). The first planes can each comprise a mask plane and foreground plane combination. The binary images in the first planes are structurally analyzed to identify different regions of text, tables, handwriting, line art, equations, etc., using a document model that has information of size, shape, and spatial arrangement of possible regions. Then, the method extracts (crops out) these regions from the foreground plane to create second mask/foreground plane pairs. Thus, the method creates "second" planes from the first planes, so that a separate second plane is created for each of the regions. Next, tags are associated with each of the second planes (to create tagged mask/foreground plane pairs) and the second planes and associated tags are combined into a mixed raster content (MRC) document. Then, the MRC can be stored and/or transmitted so that the method can perform a separate recognition process (e.g., OCR, table recognition, handwriting recognition, line art recognition, equation recognition, etc.) on each of the second planes to produce tagged output.

The tags comprise information of spatial locations of the regions within the first planes, and are a modified hint plane syntax. Each different text region contains homogeneous text that has a substantially similar size and font, which makes the OCR processing more efficient and accurate. The text regions can comprise, for example, paragraphs, titles, authors, dates, and page numbers. Comments:

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

MRC encoding is a method for increased image compression where an image is segmented into a number of data types and an appropriate compressor is applied to each type. This affords greater compression than a single compressor applied to all types.

Document and image processing systems often have content extraction and analysis functions in addition to scanning and printing. Content extraction is the process of recognizing text, symbols, and objects in a document. Examples include lines of text, paragraphs, tables, equations, forms, line art, and handwriting. Handley 1999 (John C. Handley, "Document Recognition," *Electronic Imaging Technology*, Ch. 8, E. R. Dougherty, ed., 1999.) In a distributed environment it is advantageous that image processing functions, such as segmentation, be separated from higher level context extraction functions. One reason is that high level processing is usually done in software.

These image processing programs incorporate sophisticated, complex, and intelligent algorithms that are embodied in very expensive computer programs. It makes economic sense to offer this functionality on a server and have it serve many hardware-based, cheaper scanners with image processing capability. Further, image processing operations are very time consuming because of the immense amount of data they must process. It can make more sense to embody image processing algorithms in hardware and provide recognition services elsewhere on the network to improve overall system throughput.

In embodiments herein, MRC is used to separate this functionality. First, an image is segmented into planes that indicate regions containing textual or symbolic content. This mask or masks are processed by a page analysis function that tags each region or plan according to its content, such as text, tables, handwriting, line art, equations, etc. These regions can be detected using pixel statistics by methods. These tags are incorporated into the MRC encoding for storage or transmission. Upon retrieval or reception by a document recognition server, the MRC file is parsed to extract those regions containing symbolic content. Paragraphs or lines of text can be sent to a pure OCR module, tables can be sent to a specialized module for table recognition (for example, U.S. Pat. No. 6,006,240, the complete disclosure of which is incorporated herein by reference), handwriting sent to a handwriting module, etc.

Figure 1:
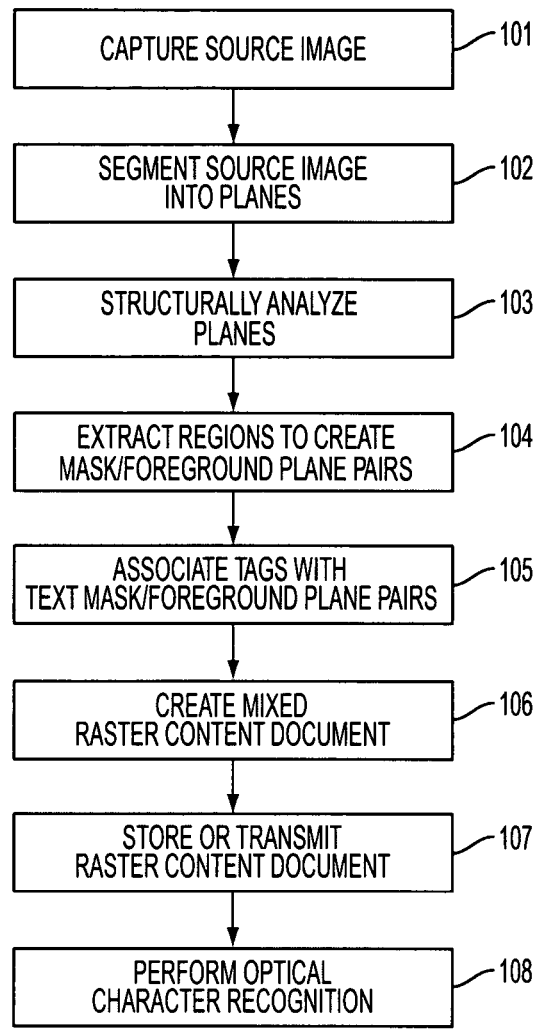
FIG. 1 is a flow diagram illustrating embodiments herein.

As shown in flowchart form in FIG. 1, a method embodiment herein begins by capturing a source image (e.g., scanning a color document) in item 101. The source image is segmented into first planes (e.g., background plane, a foreground plane (comprising primarily text color), a mask plane containing image data, and a plurality of mask/foreground plane pairs) in item 102.

Figure 2:
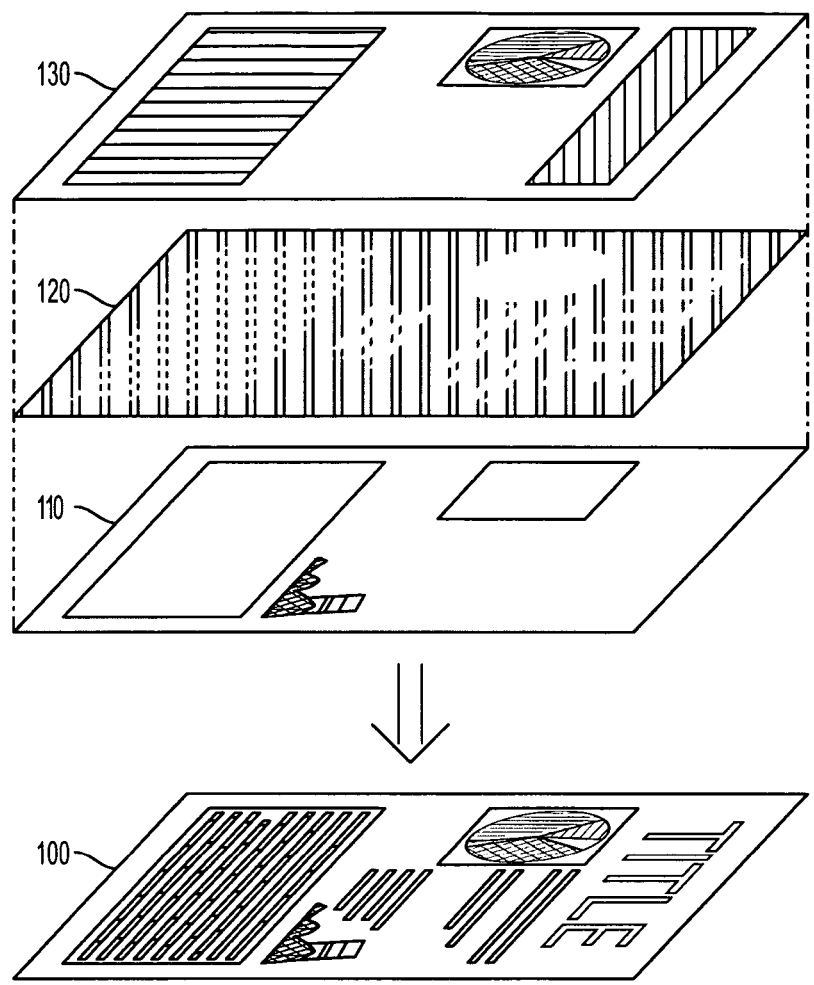
FIG. 2 is a schematic representation of an image segmented into different planes.
Figure 3:
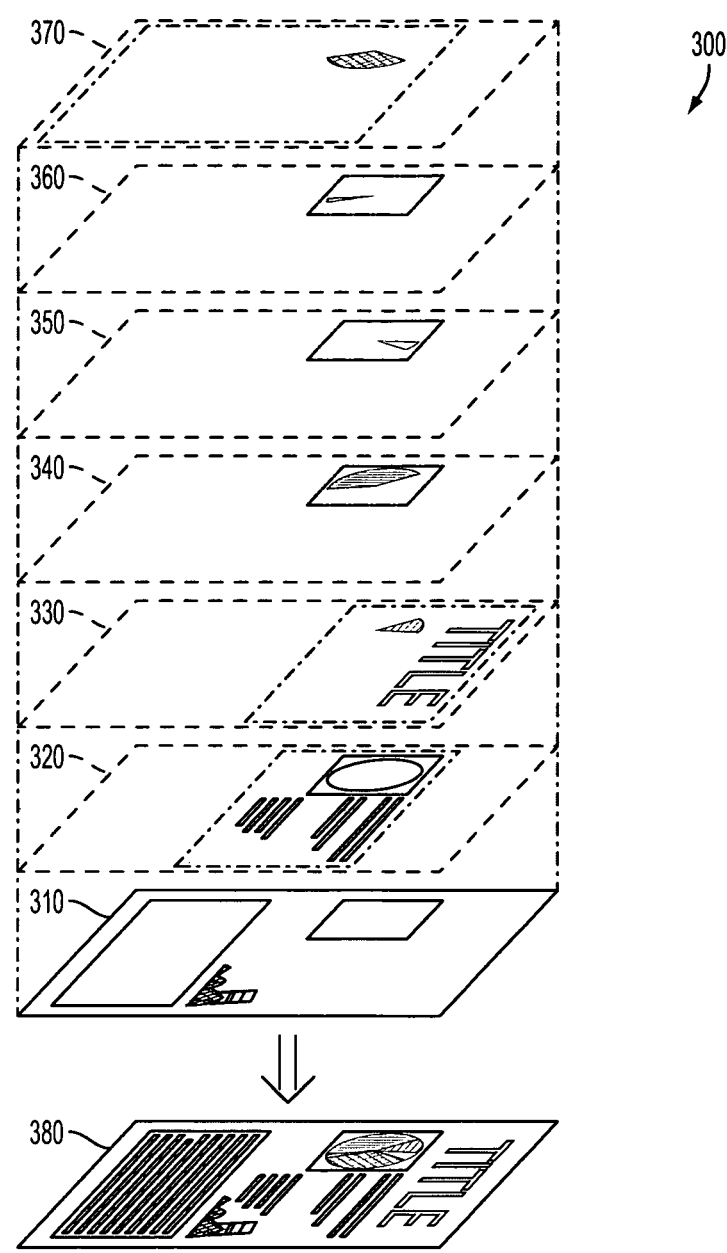
FIG. 3 is a schematic representation of an image segmented into different planes.

Details of segmenting processes and systems are described in U.S. Patent Publication 2005/0180642, the complete disclosure of which is incorporated herein by reference, and some figures and portions of which are incorporated herein. Examples of a three-layer mixed raster content image data are shown in FIGS. 2-3. As shown in FIG. 2, a document image 100 to be rendered using the mixed raster content format is generated using a background plane 110, a foreground plane 130, and a selector plane 120. A fourth, non-image data plane can also be included in the mixed raster content image data file. This fourth plane often contains rendering hints which can be used by a rendering engine to provide additional instruction on how particular pixels are to be rendered.

As shown in FIG. 2 and as described in U.S. Patent Publication 2005/0180642, the selector plane 120 is used to mask undifferentiated regions of color image data stored on the foreground plane 130 onto the background plane 110 to form the rendered image 100. In particular, the selector plane 120 contains high spatial frequency information for regions otherwise having slowly changing color information. In effect, regions whose color changes relatively slowly, if at all, are placed onto the foreground plane 130. The shapes of those regions are then embedded into the selector plane 120. In contrast, regions having high color frequency, e.g., colors whose values change more significantly over very small spatial extents, are stored as continuous tone image data on the background plane 110. When the image 100 is to be generated, the color information stored in the foreground plane 130 has spatial or shape attributes applied to it based on the binary information stored in the selector plane 120 and the resulting shaped color information is combined onto the background plane 110 to form the reconstructed image 100.

Rather than using the three-layer format outlined above with respect to FIG. 2, image data can be decomposed into a background plane and a plurality of binary foreground planes. This is illustrated in detail in FIG. 3 where, as described in U.S. Patent Publication 2005/0180642, a document image 300 is decomposed into a background continuous tone or grayscale plane 310 and, for example, six binary foreground planes 320-370. Each of the binary foreground planes 320-370 defines the spatial extents of low spatial frequency color image data to be combined onto the background plane 310. However, unlike the three-layer mixed raster content shown in FIG. 2, rather than obtaining the color data from a separate foreground plane, each of the multiple binary foreground planes 320-370 has a specific color associated with that plane. The image data is separated into a number of distinct color values, six in this example, where each of the six color values is associated with a particular binary foreground plane. In addition, the pictorial and other color information not lifted to the plurality of foreground planes, if any, are left on the color background plane 310. Thus, the image data is decomposed to form the background plane 310 and the multiple binary foreground planes 320-370.

The image data in any of the multiple binary foreground planes 320-370 does not overlap the image data in any other one of the multiple binary foreground planes 320-370. As a result, each of the binary foreground planes 320-370 can be individually combined with the background plane 310 without regard to order or sequence. When each of the multiple binary foreground planes 320-370 is combined with the background plane 310 by applying the color value associated with that binary foreground plane to the background plane 310 according to the binary data on that binary foreground plane, the resulting image 380 is obtained.

Referring again to FIG. 1, the first planes can each comprise a mask plane and foreground plane combination. The binary images in the first planes are structurally analyzed in item 103 to identify different regions using a document model that has information of size, shape, and spatial arrangement of possible regions of text, tables, handwriting, line art, equations, etc. For example, U.S. Patent Publication 2003/0215137, and U.S. Pat. No. 6,954,532, the complete disclosures of which are incorporated herein by reference, describe processes for identifying text regions. Such systems may produce regions corresponding to authors, titles, tables, etc., without recognizing the text. The analysis is done using size, shape, and spatial arrangements of connected components.

Then, in item 104 the method extracts (crops out) these regions from the foreground plane to create second mask/foreground plane pairs. Thus, the method creates "second" planes from the first planes, so that a separate second plane of only one region is created for each of the text regions.

Next, in item 105, tags are associated with each of the second planes (to create tagged mask/foreground plane pairs) and the second planes and associated tags are combined into a mixed raster content (MRC) document in item 106. For example, U.S. Patent Publication 2004/0263908, the complete disclosure of which is incorporated herein by reference, describes a process whereby documents are scanned to produce device-independent raster images. The resulting raster images are analyzed and segmentation information is generated. The segmentation information is preserved as tags which accompany the raster image data. The segmentation tags can be saved without any additional processing, or be converted into a more general type of information called hints.

Then, in item 107 the MRC can be stored and/or transmitted so that the method can perform a separate recognition process (item 108) such as OCR, table recognition, handwriting recognition, line art recognition, equation recognition, etc. on each of the second planes to produce tagged textual output. The recognition processes can be performed using any commercially available recognition software programs.

The tags comprise information of spatial locations of the text regions within the first planes and are a modified hint plane syntax. Each of the different text regions contain homogeneous text that has a substantially similar size and font, which makes the OCR processing more efficient and accurate. The text regions can comprise, for example, paragraphs, titles, authors, dates, and page numbers.

Figure 4:
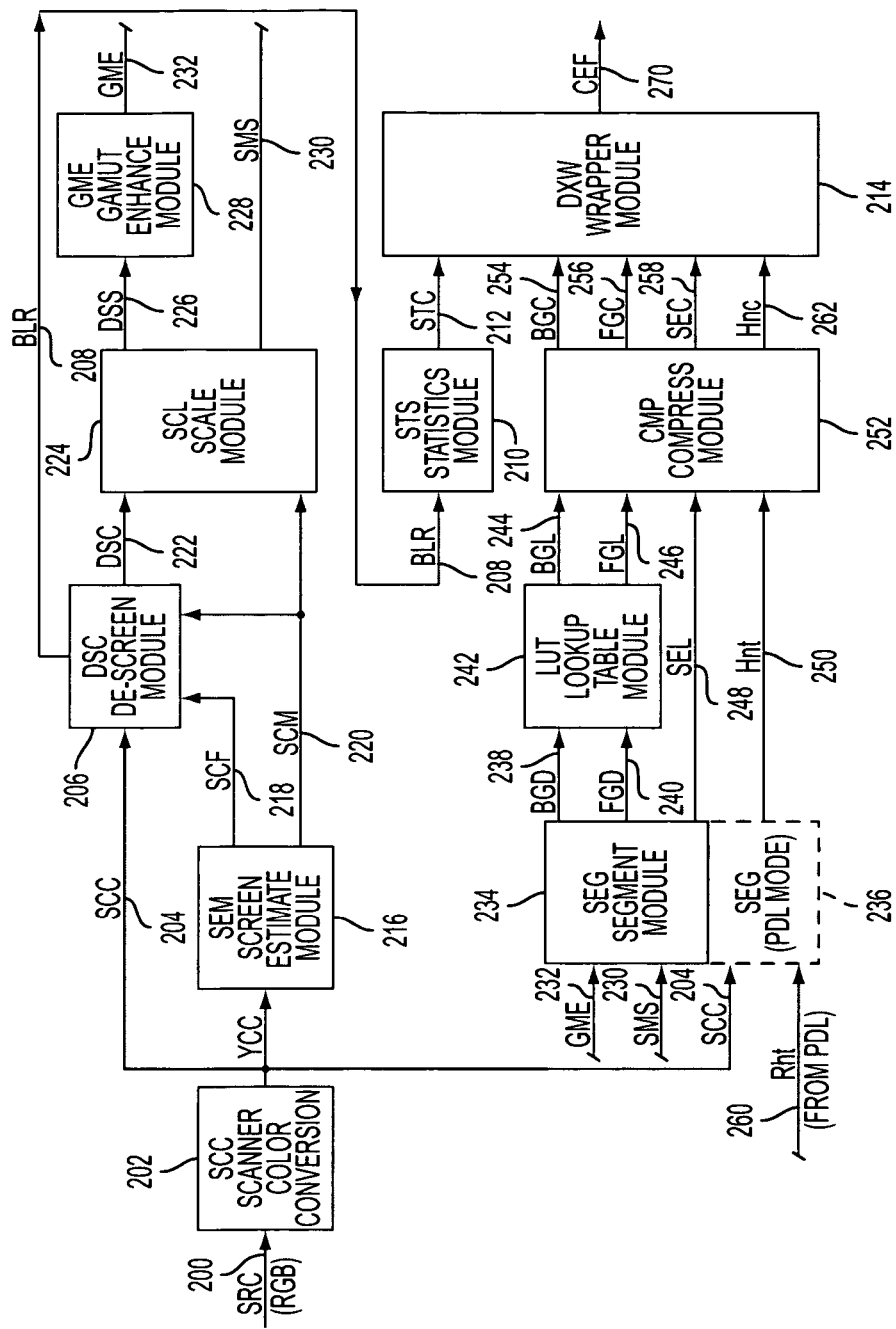
FIG. 4 is a schematic representation of a block diagram of an encode pipeline for using mixed raster content images.

FIG. 4 shows one exemplary embodiment of a three-layer image data, generating system, as described in U.S. Patent Publication 2004/0071362, the complete disclosure of which is fully incorporated herein by reference. As shown in FIG. 4, an encoder pipeline accepts RGB data from the scanner input SRC 200 on the top left. The Scanner Color Conversion (SCC) Module 202 converts the input data from RGB into a YCC color space, which is more convenient for de-screening and segmentation. The module SCC 202 uses three 1D TRC lookup tables followed by a 3×3 matrix multiply unit. The SCC output 204 is delivered to the Screen Estimate Module (SEM) 216 and the De-Screen Module (DSC) 206. In addition, the encode pipeline can handle synthetic (noise-free) input images such as PDL images that are produced during printing. In this special PDL mode 236, the de-screen unit is bypassed, and the SCC output 204 is directly forwarded to the PDL Segment Module (SEG) 236, which operates in the special segmentation mode.

The Screen Estimate Module (SEM) 216 estimates the halftone screen frequency and magnitude, which are subsequently used by the De-Screen (DSC) 206 and Segment (SEG) 234 Modules. The SEM Module 216 operates on the luminance channel Y of the input scanner data, obtained after conversion from RGB to YCC in the SCC 202 Module. The SEM 216 Module uses one or more independent channels with different sensitivities (e.g., Max, High, and Low). The most sensitive channel derives the frequency estimate, and the two other less-sensitive channels are combined to create the screen magnitude. The Screen Estimate Module 216 provides two [single-component] outputs: the screen frequency estimate Scf 218 and screen magnitude estimate Scm 220, which are used by the De-Screen (DSC) 206 and Segment (SEG) 234 Modules. The screen magnitude can be interpreted as the confidence level that local area near the pixel of interest is a halftone screen. The Screen Estimate Module 216 is bypassed for synthetic (noise free) input.

The purpose of the De-Screen (DSC) 206 Module is to selectively eliminate the halftone screens from the scanned input signal, while preserving or enhancing the sharp edge information of text or line art objects. The De-Screen Module 206 operates on the converted YCC image that was produced by the Scan Color Conversion (SCC) 202 Module. The module uses the estimated screen frequency Scf 218 and magnitude Scm 220 signals from the Screen Estimate Module 216 (SEM). The method of de-screening is based on a dynamically controlled filter bank, providing variable blending among multiple filtered outputs. The module also includes independent continuous control of post-blur sharpening using a variable un-sharp masking mechanism, and provides the capability to adjust the neutrality of pixels at the output. The De-Screen Module 206 produces the de-screened output signal DSC 222, and, in addition, the module 206 also produces the blurred version of the input signal BLR 208 used by the Statistics Module (STS) 210.

The Scale Module (SCL) 224 scales the incoming data by arbitrary amounts in either dimension. The method of scaling is 2D bi-linear interpolation. The module 224 relies on the de-screen module 206 to perform any necessary pre-filtering (e.g., for reduction). The encode pipeline uses two instances of the Scale Module SCL 224. In one instance, the de-screener output DSC 206 is scaled to produce the output DSS 226; in the second instance, the Scm 220 signal from the Screen Estimate Module 216 is scaled to produce the output SMS 230. The Scaled De-screener output DSS 226 is enhanced by the Gamut Enhance Module GME 228. The resulting GME 232 output as well as the SMS 230 are forwarded to the Segment Module (SEG) 234. It should be noted that DSS 226 is a full color (3-component) signal, while SMS 230 is only monochrome (single component).

The Gamut Enhance Module (GME) 232 applies 3 independent Tone Reproduction Curves (TRC) to each of the color components of the input image. The implementation is done via three independent and fully programmable 1D lookup tables. The input to the Gamut Enhance Module 232 is the output DSS 226 from the Scaling Module (SCL) 224, representing a scaled and de-screened version of the source image. The output is the gamut-mapped signal GME 232.

The purpose of the Segment Module 234 is to segment the incoming image into the three MRC layers: Foreground 240, Selector 248, and Background 238 planes. A separate segmentation mode is also provided for synthetic (noise-free) images. The module 234 operates on the gamut-enhanced color image GME 232 from the Gamut Enhance Module 228. The module also uses the screen magnitude estimated signal SCM 220 from the Screen Estimate Module (SEM) 216. The SEG module 234 outputs two full-color images FGD 240 and BGD 238 corresponding to the Foreground and Background planes, and one binary output SEL 248 image for the Selector plane. In addition, the Screen Estimate Module 234 can preserve incoming PDL hints 250, if available, for the special case of synthetic (noise free) images. The incoming Rht hints 260 are mapped to CEF hints plane Hnt.

The Lookup Table (LUT) Module 242 converts the color Foreground and Background data from YCC to device-independent Lab color space before compression. The method of conversion uses 3D tetra-headral interpolation with variable power-of-two node spacing. The encode pipeline uses 2 separate instances of the LUT Module 242: In one instance, the Foreground input FGD 240 that is produced by the Segment Module (SEG) 234 is converted from YCC to Lab. In the second instance, the Background input BGD 238 from the Segment Module 234 is converted from YCC to Lab. A third LUT instance is also used in the decode pipeline (not shown), to convert the merged data from Lab to device CMYK.

The Color Lookup Table Module LUT 242 takes as input the source YCbCr color signal 238 and converts it to LAB using the given 3D LUT. Two instances of the Color Lookup Table Module are used: one to convert the source foreground SEG_Fgd to produce Fgd, and the second to convert the background SEG_Bgd into Bgd. Note that the same LUT table is used in both instances.

Each of the circuits, routines, applications, modules or the like outlined above can be implemented as software that is stored on a computer-readable medium and that is executable on a programmed general purpose computer, a programmed special purpose computer, a programmed microprocessor, a programmed digital signal processor or the like. Such a computer-readable medium includes using a carrier wave or the like to provide the software instructions to a processing device. Each of the circuits, routines, applications, objects, procedures, managers and/or modules outlined above can be implemented as portions of a suitably programmed general purpose computer. Alternatively, each of the circuits, routines, applications, objects, procedures, managers and/or modules can be implemented as physically distinct hardware circuits within an ASIC, using a digital signal processor DSP, using an FPGA, a PLD, a PLA and/or a PAL, or using discrete logic elements or discrete circuit elements. The particular form the circuits, routines, applications, objects, procedures, managers and/or modules will take is a design choice and it will be obvious and predictable to those skilled in the art. The circuits, routines, applications, objects, procedures, managers and/or modules do not need to be of the same design.

Thus, although usually intended as a means to represent segmentation data for rendering or compression, the embodiments herein use tags to carry page analysis information. This is done using the hints encoding facility, developed for rendering hints, but modified for text tags. Each binary region is used to crop out its part of the foreground and is stored as a mask/foreground pair. Tags are assigned to each region using a modification of the rendering hints syntax. The resulting stored document is ready for different recognition processing, one region at a time with a predetermined tag.

With embodiments herein, MRC can be used to be used to separate functionality in a system. For example, the image segmentation function can be separated from the recognition function. These functions can be distributed across a system. The embodiments provide a standard carrier of the segmentation information destined for a recognition service.

Recognition systems are more accurate when handling regions of homogeneous text. The embodiments herein perform segmentation up front and do as much analysis as possible before the document is sent for OCR processing, table recognition, handwriting recognition, etc.

All foregoing embodiments are specifically applicable to electrostatographic and/or xerographic machines and/or processes. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:

using a first processor, capturing a source image;

using said first processor, segmenting said source image into first planes;

using said first processor, structurally analyzing said first planes using a document model to identify different regions each of said regions sharing similar text attributes comprising at least one of a specific size and shape;

using said first processor, creating second planes from said first planes such that a separate second plane is created for each of said regions;

using said first processor, associating tags with said second planes, said tags comprising spatial location of said regions within said first planes;

using said first processor, combining said second planes and associated tags into a mixed raster content document; and using a second processor, performing a separate recognition process on each of said second planes, wherein each of said first planes comprises a mask plane and foreground plane combination.

2. The method according to claim 1, wherein said tags comprise information of spatial locations of said regions within said first planes.

3. The method according to claim 1, wherein said tags comprise a modified hint plane syntax.

4. The method according to claim 1, wherein text regions of said regions contain homogeneous text comprising text having a substantially similar size and font.

5. The method according to claim 1, wherein said document model comprises information of size, shape, and spatial arrangement of items within said regions.

6. A non-transitory computer-readable medium that stores computer-readable instructions that, when executed by a computer, cause the computer to perform a computer-implemented method comprising:

capturing a source image using a first machine;

segmenting said source image into first planes using said first machine;

structurally analyzing said first planes to identify different regions using said first machine each of said regions sharing similar text attributes comprising at least one of a specific size and shape;

creating second planes from said first planes such that a separate second plane is created for each of said regions using said first machine;

associating tags with said second planes using said first machine, said tags comprising spatial location of said regions within said first planes;

combining said second planes and associated tags into a mixed raster content document using said first machine; and performing a separate recognition process on each of said second planes using a second machine, wherein each of said first planes comprises a mask plane and foreground plane combination.

7. The computer-readable medium according to claim 6, wherein said tags comprise information of spatial locations of said regions within said first planes.

8. The computer-readable medium according to claim 6, wherein said tags comprise a modified hint plane syntax.

9. The computer-readable medium according to claim 6, wherein text regions of said regions contain homogeneous text comprising text having a substantially similar size and font.

10. The computer-readable medium according to claim 6, wherein said structurally analyzing of said first planes comprises using a document model.

11. The computer-readable medium according to claim 10, wherein said document model comprises information of size, shape, and spatial arrangement of items within said regions.

* * * * *